C. E. WOODS.

TALKING MACHINE.

APPLICATION FILED DEC. 3, 1914.

Reissued Dec. 21, 1915.

14,035.

Inventor

Clinton E. Woods.

Witnesses

J. B. Wegenast.

R. C. Fitzhugh.

By Mauro, Cameron, Lewis & Massie

Attorneys

UNITED STATES PATENT OFFICE.

CLINTON E. WOODS, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

TALKING-MACHINE.

14,035. Specification of Reissued Letters Patent. Reissued Dec. 21, 1915.

Original No. 1,108,301, dated August 25, 1914, Serial No. 734,236. Application for reissue filed December 3, 1914. Serial No. 875,383.

*To all whom it may concern:*

Be it known that I, CLINTON E. WOODS, a citizen of the United States, and a resident of Bridgeport, Fairfield county, Connecticut, have invented a new and useful Improvement in Talking-Machines, which invention is fully set forth in the following specification.

My invention relates to the sound-conveyer employed in talking-machines for connecting the sound-box with the amplifying horn. This conveyer is frequently referred to in the art as a "tone-arm".

One object of the invention is to produce a tone-arm that is correctly designed, from an acoustical point of view, and with a continuous and unobstructed passage-way for the sound-waves from the vibrating diaphragm to the horn.

Another object is the production of a tone-arm which shall be free from vibration and free from rattling of the parts, yet capable of universal movement.

A further object is the production of a standardized tone-arm,—that is, one which can be used to equal advantage on a "visible horn" machine or a "concealed horn" machine,—at the same time being simple and efficient in construction, and attractive in appearance.

The invention will be best understood by reference to the accompanying drawings, in which—

Figure 1:
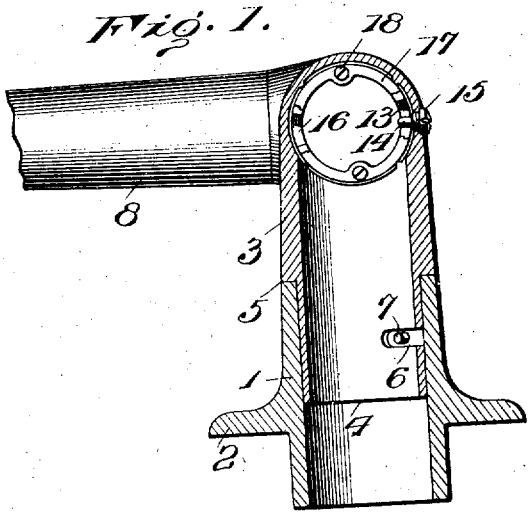
Figure 2:
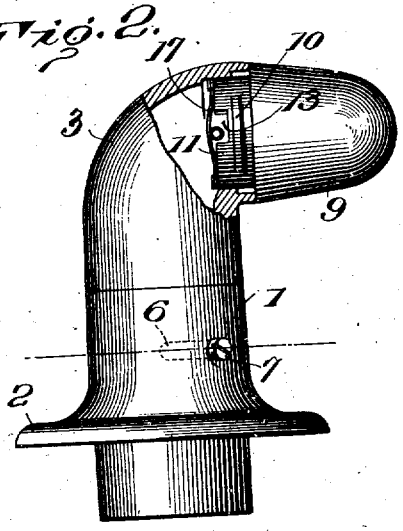
Figure 3:
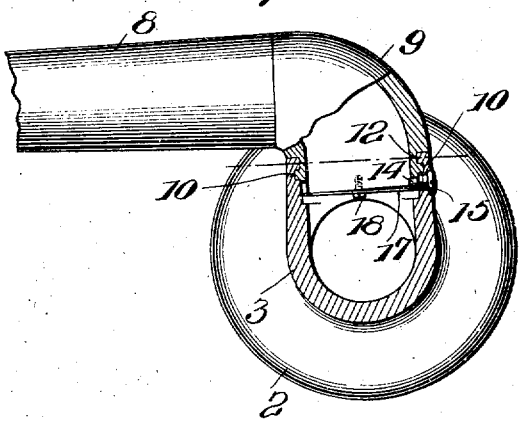
Figure 4:
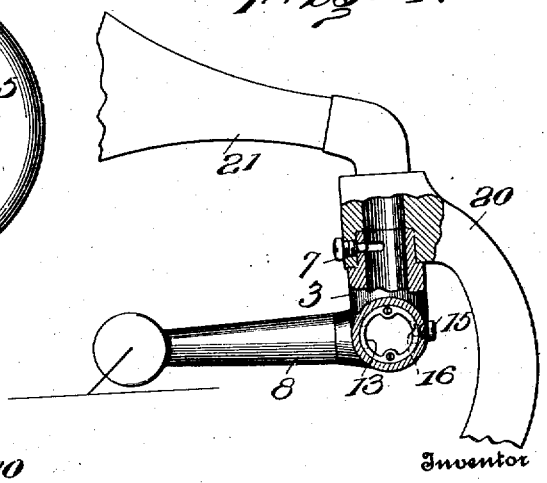
Figure 5:
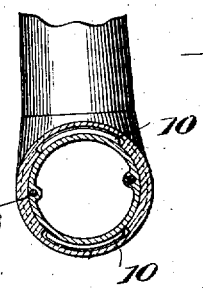

Figure 1 is a side view of a portion of the so-called "tone-arm" or sound-conveyer, mounted for use with a "concealed horn" talking-machine so-called, showing the mounting therefor in vertical section; Fig. 2 is an end view of the same, looking from the right of Fig. 1, and partly in section; Fig. 3 is a plan view of Fig. 1, partly in horizontal section; Fig. 4 is a side view showing the tone-arm in connection with a "visible horn" machine; and Fig. 5 is a sectional view showing details.

Referring to Figs. 1–3, 1 represents the stationary member, shown as a vertical tube or sleeve having a horizontal flange 2, and adapted to be secured upon the supporting shelf of the cabinet (or upon the base-plate of the talking-machine), to communicate with the smaller end of the usual stationary sound-conveyer or "horn" contained within the cabinet (but not shown). 3 is the tubular intermediate member or elbow, having the reduced portion 4 fitting snugly within the bore of the stationary member 1, and having the shoulder 5 resting upon the upper end of the same. 6 is a horizontal slot in the reduced portion 4, and 7 a set-screw carried by the stationary member and entering said slot to limit the axial movement of the elbow, and also serving to prevent withdrawal thereof. 8 is the swinging sound-conveyer or "tone-arm", having the proper taper, and carrying at its outer end any suitable sound-box (not shown), and at its inner end curved (in a horizontal plane) to present the elbow 9. This elbow 9 is swiveled to the intermediate elbow 3 so as to swing in a vertical plane, so that by reason of this joint and the swiveling of the intermediate member in the stationary member 1, the sound-box can have universal movement.

More specifically, the tone-arm and the intermediate member are telescoped and are detachably connected by a breech-lock or bayonet-joint coupling, in which 10—10 represent an interrupted radial flange carried by the reduced cylindrical portion 11 of the elbow 9 to constitute the male member; and 12 (Fig. 3) is the interrupted internal flange carried by the elbow-member 3 to provide an annular groove, thus constituting the female member for receiving the interrupted flange 10. The end-face of the reduced portion 11 is cut away at 13, to receive the tapered stop-pin 14 which projects from the set-screw 15 carried by the intermediate member 3. Diametrically opposite this cut-away 13, is a similar cut-away 16, for the purpose to be described later.

17 is a thin piece of spring material arcuate in form and preferably a complete annulus, secured, as by screws 18, upon the end-face of the reduced portion 11, concentric therewith, and adapted to bear upon the tapered stop-pin 14, to prevent any looseness of parts and consequent rattle. By turning the set-screw 15 in or out, the tensioned engagement between the spring 17 and the stop-pin 14 can be properly adjusted, the tone-arm and the intermediate member being drawn toward each other when the stop-pin is forced inwardly.

It will be observed that the spring 17 is of the cantaliver type. By a cantaliver spring is meant one which is rigidly connected at one or more points to the member which carries it and which projects from the point or points of connection, the projecting part having lateral engagement with another member. The efficacy of a cantaliver spring is dependent not only on its own resiliency, but also on the rigidity of its connection to its support. In the present instance, the annular spring 17 is rigidly connected to the portion 11 of the elbow 9 by the two screws 18 and from the screws it projects transversely to the side of the elbow where it is laterally engaged by the pin 14.

It will be observed that there is a continuous and uninterrupted passageway from the sound-box—through the tone-arm, the intermediate elbow, and the stationary member—into the stationary horn; and that there are no projections (of fastening-devices or the like) into this passageway, nor are there any such external projections. Furthermore, owing to the fewness of parts and their simplicity of construction and directness of connection, and the consequent absence of rattle, the present construction permits dispensing with the soft-rubber insulation heretofore commonly employed in connecting the sound-box to the tone-arm. Indeed, the sound-box may be made integral with, or secured directly and rigidly to, the end of the tone-arm.

Referring now to Fig. 4, 20 represents the supporting-bracket commonly employed in "visible horn" machines, to which any suitable horn 21 is secured in any convenient usual manner. The same intermediate elbow 3 has, however, been turned upside down, and its reduced portion 4 is journaled within the bracket, so that the elbow itself depends therefrom. The set-screw 15 has been retracted, so as to permit the tone-arm 8 to be swung through an angle of 180° in order to bring the sound-box and its stylus into proper position; and the set-screw 15 has then been restored to place, engaging with the second cut-away 16. In short, by means of the present invention the tone-arms and the intermediate elbows are standardized and can be put in stock, ready for use as desired, either upon the "concealed horn" machines or upon the "visible horn" machines, which greatly simplifies and cheapens manufacturing-operations. And, in either service, the structure is of the greatest efficiency.

I have thus described my invention with considerable detail, but only for the sake of clearness, since my invention is not limited to the details of construction and arrangement above set forth, but may be modified considerably without departing from the spirit of the invention. For instance, the male and female coupling-members might be mutually transposed, or some other form of coupling employed; the anti-rattling spring 17 might be dispensed with altogether; or some other anti-rattler employed; and other changes made without departing from the broad invention.

Having thus described my invention, I claim:—

1. In a tone-arm for talking machines, a vertical member having a horizontally extending elbow, a horizontal member having a horizontally extending elbow, a bayonet-joint connection between said horizontally extending members, and a cantaliver spring mounted on one of said members and bearing against the other, the tendency of said spring being to force said members toward each other.

2. In a tone-arm for talking machines, the combination of a vertical member having a horizontally extending elbow and a horizontal member having a corresponding horizontally extending elbow, one of said elbow members having interiorly formed bayonet-joint elements and the other elbow member having corresponding bayonet-joint members on the reduced end thereof, and a spring mounted on said reduced end and bearing against the other member.

3. In a tone-arm for talking machines, the combination of a vertical member having a horizontally extending elbow and a horizontal member having a corresponding horizontally extending elbow, one of said elbow members having interiorly formed bayonet-joint elements and the other elbow member having corresponding bayonet-joint members on the reduced end thereof, a spring mounted on said reduced end and bearing against the other member, and means for adjusting the tension of said spring.

4. In a tone-arm for talking machines, a vertical member, a horizontal member, a spring mounted on one of said members, and means mounted on the other member and projecting between said spring and the member on which said spring is mounted, said means being adjustable to force said members toward each other.

5. In a tone-arm for talking machines, a vertical member, a horizontal member, a circular spring mounted on one of said members, and means mounted on the other member and projecting between said spring and the member on which said spring is mounted, said means being adjustable to force said members toward each other.

6. In a tone-arm for talking machines, a vertical member, a horizontal member, a cantaliver spring mounted on one of said members, and a pin mounted on the other and engaging said spring, said pin being adjustable to draw said members toward each other.

7. In a tone-arm for talking machines, a vertical member having a horizontally extending elbow, a horizontal member having a horizontally extending elbow, a cantaliver spring mounted on one of said members, and a pin mounted on the other and engaging said spring.

8. In a tone-arm for talking machines, a vertical member having a horizontally extending elbow, a horizontal member having a horizontally extending elbow, a circular spring mounted on one of said members, and a pin mounted on the other and engaging said spring.

9. In a tone-arm for talking machines, a vertical member having a horizontally extending elbow, a horizontal member having a horizontally extending elbow, a spring mounted on one of said members, and a tapering pin mounted on the other and engaging said spring.

10. In a tone-arm for talking machines, a vertical member, a horizontal member, and means for forcing said members toward each other including an element mounted on one member and a device mounted on the other member and projecting between said element and the member on which it is mounted.

11. In a tone-arm for talking machines, a vertical member, a horizontal member, and means for forcing said members toward each other including an element mounted on one member and an adjustable device mounted on the other member and projecting between said element and the member on which it is mounted.

12. In a tone-arm for talking machines, a vertical member having a horizontally extending elbow, a horizontal member having a horizontally extending elbow, a bayonet-joint connection between said horizontally-extending members, and means for forcing said members toward each other including an element mounted on one member and an adjustable device mounted on the other member and projecting between said element and the member on which it is mounted.

13. In a tone-arm for talking machines, a vertical member, a horizontal member, an annulus mounted on one of said members, and means mounted on the other member and projecting between said annulus and the member on which it is mounted, said means being adjustable to force said members toward each other.

14. In a tone-arm for talking machines, a vertical member, a horizontal member, an annulus mounted on one of said members, and a tapering pin mounted on the other member and projecting between said annulus and the member on which it is mounted, said pin being adjustable to force said members toward each other.

15. In a tone-arm for talking machines, a vertical member having a horizontally extending elbow, a horizontal member having a horizontally extending elbow, a bayonet-joint connection between said horizontally extending members, a spring mounted on one of said members, and means mounted on the other member projecting between said spring and the member on which said spring is mounted, said means being adjustable to force said members toward each other.

16. In a tone-arm for talking machines, a vertical member having a horizontally extending elbow, a horizontal member having a horizontally extending elbow, a bayonet-joint connection between said horizontally extending members, a spring mounted on one of said members, and a tapering pin mounted on the other member projecting between said spring and the member on which said spring is mounted, said pin being adjustable to force said members toward each other.

17. In a tone-arm for talking machines, a vertical member having a horizontally extending elbow, a horizontal member having a horizontally extending elbow, a bayonet-joint connection between said horizontally extending members, an annulus secured to one member, and means mounted on the other member projecting between said annulus and the member on which it is mounted, said means being adjustable to force said members toward each other.

18. In a tone-arm for talking machines, the combination of vertical and horizontal hollow sound-conveying members, one of the said members having an elbow detachably telescoped within the other and the two members together providing a single continuous sound-passage, and a spring located inside the tone-arm and outside the sound-passage therethrough, the said spring engaging the end of the said elbow and bearing against the other member, thereby serving to press the elbow endwise relatively to the other member thus preventing rattling.

19. In a tone-arm for talking machines, the combination of vertical and horizontal hollow sound-conveying members, one of the said members being detachably telescoped within the other and the two members together providing a single continuous sound-passage, and a cantaliver spring located inside the tone-arm and connected to one of said members and bearing against the other member.

20. In a tone-arm for talking machines, the combination of a vertical member having a horizontally extending elbow, a horizontal member having a horizontally extending elbow horizontally pivoted to the first said elbow, and a cantaliver spring mounted on one of said elbows and bearing against the other elbow.

21. In a tone-arm for talking machines, the combination of a vertical member having a horizontally extending elbow, a horizontal member having a horizontally extending elbow horizontally pivoted to the first said elbow, one of said elbows being provided with a circumferentially extending slot, a spring mounted on the slotted elbow, and a pin mounted on the other elbow in engagement with the spring and extending into the slot and adapted to engage either end thereof to limit relative movement between the elbows.

22. In a tone-arm for talking machines, the combination of a vertical member having a horizontally extending elbow, a horizontal member having a horizontally extending elbow horizontally pivoted to the first said elbow, one of said elbows being provided with a circumferentially extending slot, an arcuate spring carried by the slotted elbow and connected thereto at widely separated points, and a pin mounted on the other elbow in engagement with the spring between the said points of connection and extending into the slot and adapted to engage either end thereof to limit relative movement between the elbows.

23. In a tone-arm for talking machines, the combination of a vertical member having a horizontally extending elbow, a horizontal member having a horizontally extending elbow horizontally pivoted to the first said elbow, one of said elbows being provided with two diametrically opposite circumferentially extending slots, a spring mounted on the slotted elbow, and a pin mounted on the other elbow in engagement with the spring and adapted to extend into either slot and engage either end thereof to limit relative movement between the elbows.

24. In a tone-arm for talking machines, the combination of a vertical member having a horizontally extending elbow, a horizontal member having a horizontally extending elbow horizontally pivoted to the first said elbow, one of said elbows being provided with two diametrically opposite circumferentially extending slots, an annular spring carried by the slotted elbow and connected thereto at diametrically opposite points between the slots, and a pin mounted on the other elbow in engagement with the spring and adapted to extend into either slot and engage either end thereof to limit relative movement between the elbows.

25. The combination of a sound-box, a normally horizontal element connected at one end with the sound-box and provided at the other end with a horizontal elbow, a vertical member having at one end an elbow horizontally pivoted to the said horizontal elbow and at the other end one element of a journal bearing, whereby the said member may be turned downward or upward relatively to the horizontal member and be pivotally connected with a horn below or a horn above the horizontal member, and interengaging stop means on the two elbows operable to limit relative movement thereof with the vertical member extending either upward or downward as aforesaid.

26. The combination of a sound-box, a normally horizontal element connected at one end with the sound-box and provided at the other end with a horizontal elbow, a vertical member having at one end an elbow horizontally pivoted to the said horizontal elbow and at the other end one element of a journal bearing, whereby the said member may be turned downward or upward relatively to the horizontal member and be pivotally connected with a horn below or horn above the horizontal member, one of the said elbows being provided with two oppositely disposed circumferentially extending slots, and a pin on the other elbow adapted to engage either of the said slots to limit relative movement between the elbows with the vertical member extending either upward or downward as aforesaid.

27. The combination of a sound-box, a normally horizontal element connected at one end with the sound-box and provided at the other end with a horizontal elbow, a vertical member having at one end an elbow horizontally pivoted to the said horizontal elbow and at the other end one element of a journal bearing, whereby the said member may be turned downward or upward relatively to the horizontal member and be pivotally connected with a horn below or a horn above the horizontal member, one of the said elbows being provided with two oppositely disposed circumferentially extending slots, a pin on the other elbow adapted to engage either of the said slots to limit relative movement between the elbows with the vertical member extending either upward or downward as aforesaid, and an annular spring connected to the slotted member and engaging the pin.

In testimony whereof, I have signed this specification in the presence of two subscribing witnesses.

CLINTON E. WOODS.

Witnesses:

JOHN S. GRIFFITH,
LAURETTA T. NEAL.